May 11, 1937.  G. W. BAIN ET AL  2,079,893
METHOD OF MAKING LAMPS AND TUBES
Filed April 1, 1935  6 Sheets-Sheet 1
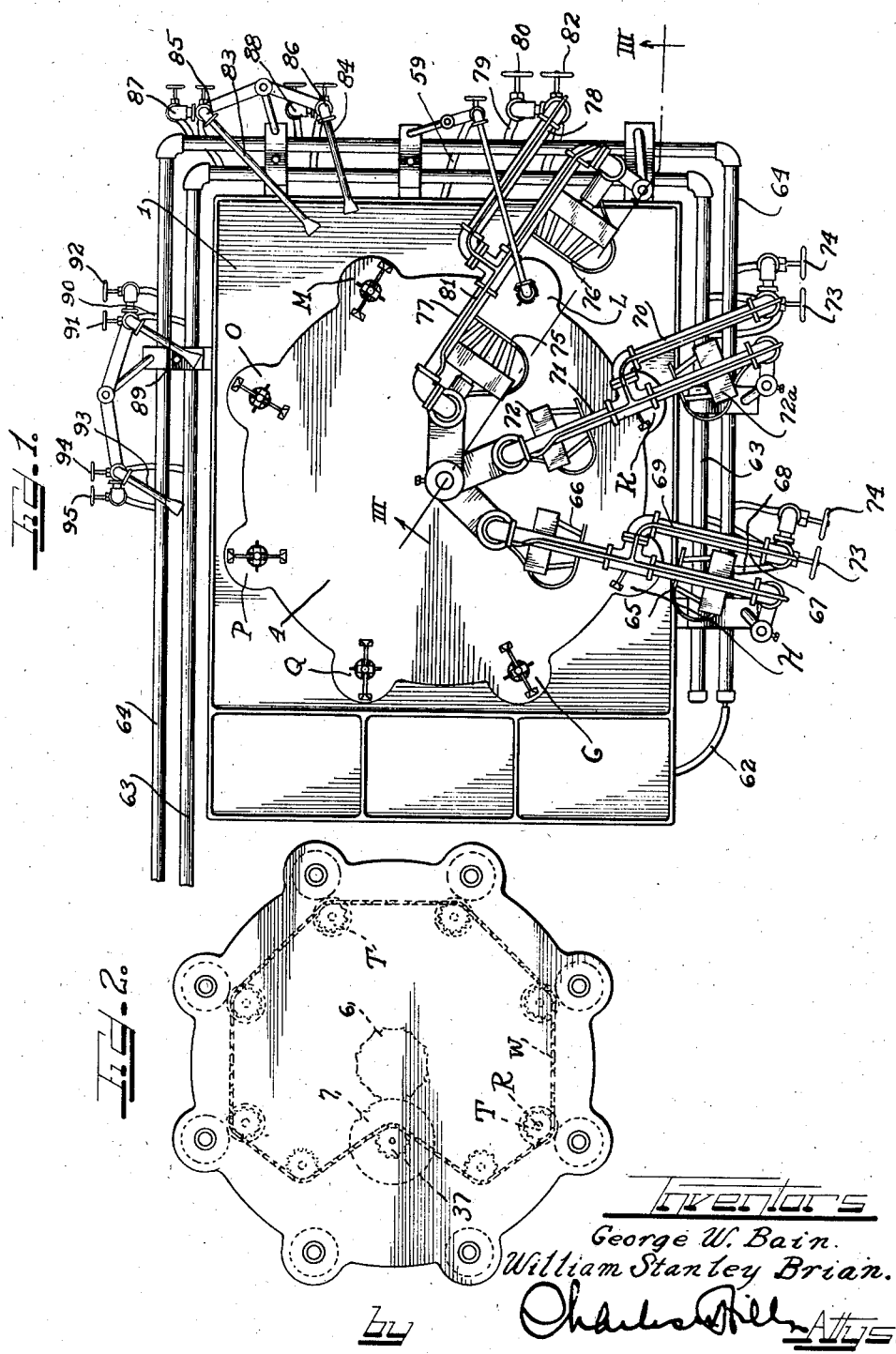

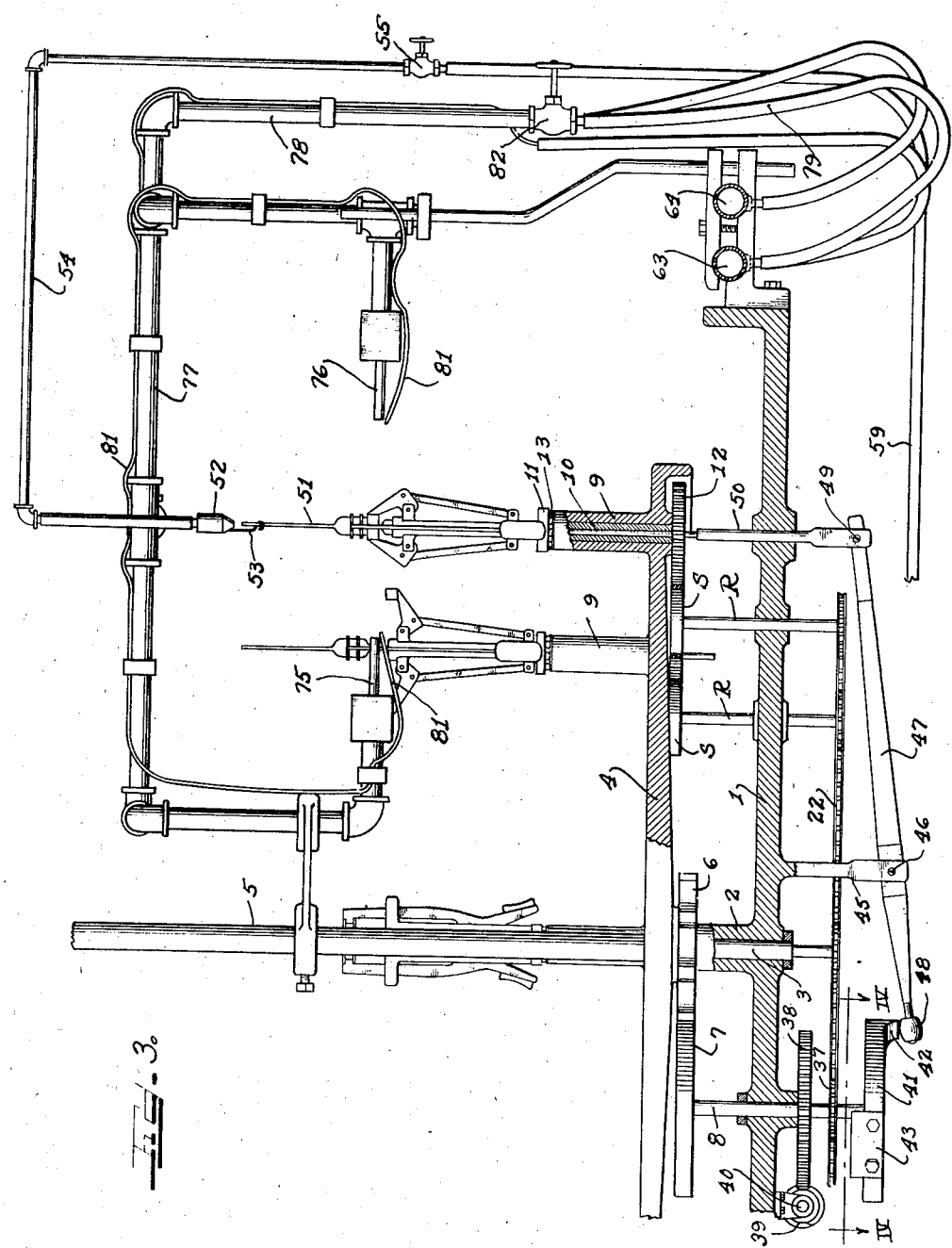

May 11, 1937.  G. W. BAIN ET AL  2,079,893
METHOD OF MAKING LAMPS AND TUBES
Filed April 1, 1935  6 Sheets-Sheet 3

Inventors
George W. Bain.
William Stanley Brian.
by Charles Allen Attys.

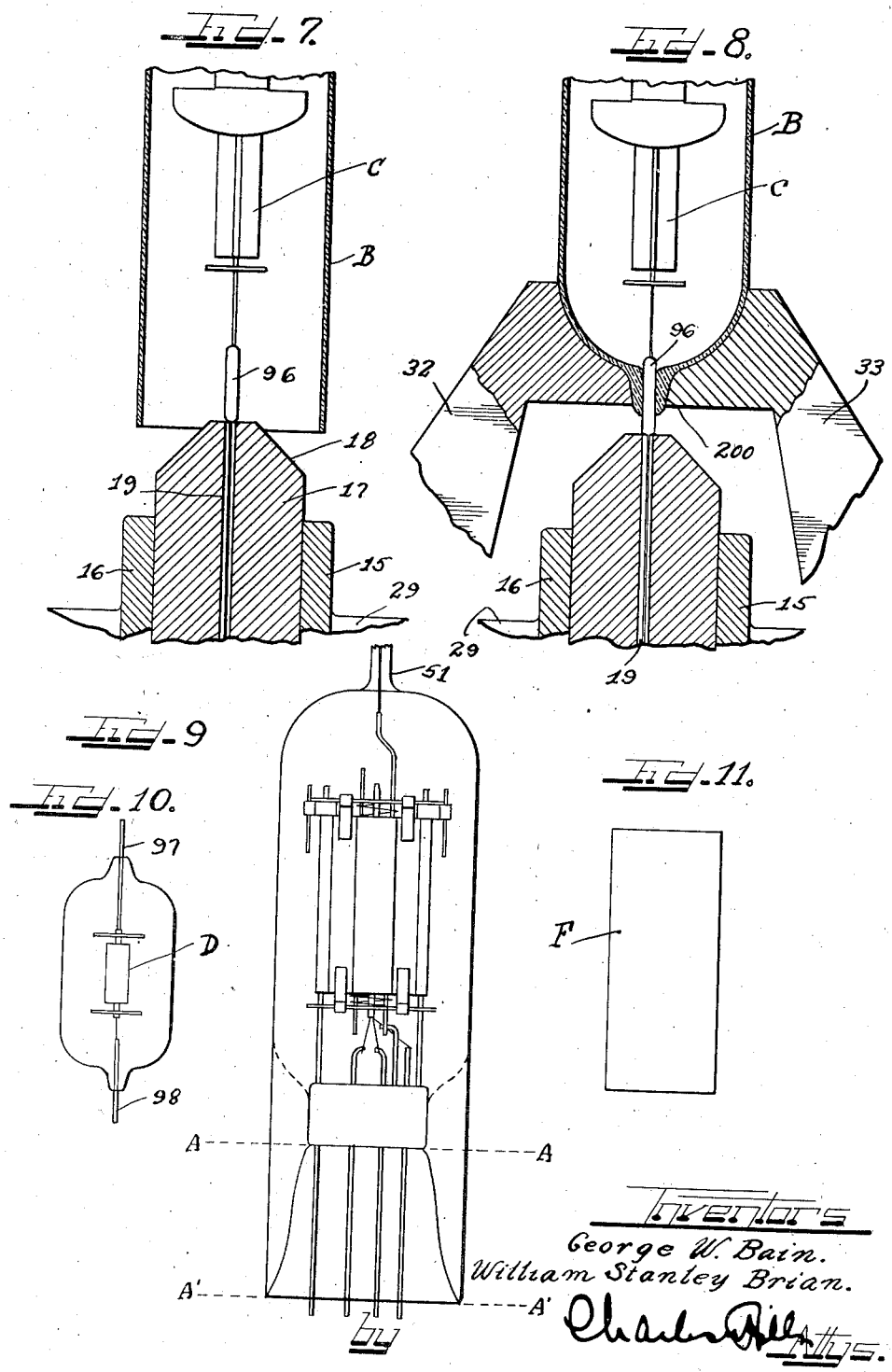

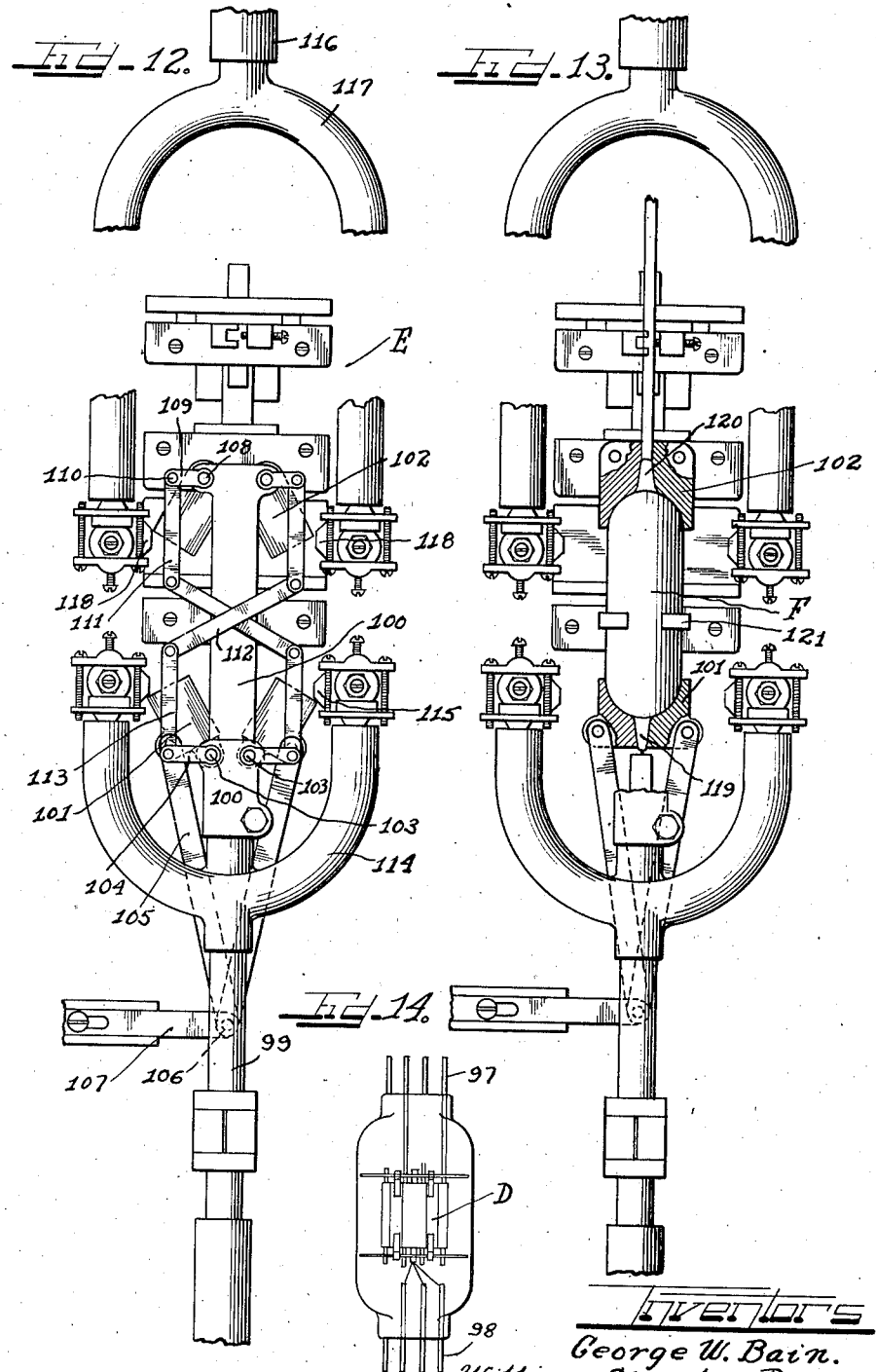

May 11, 1937. G. W. BAIN ET AL 2,079,893
METHOD OF MAKING LAMPS AND TUBES
Filed April 1, 1935   6 Sheets-Sheet 6

Inventors
George W. Bain.
William Stanley Brian
by Charles Allen Attys.

Patented May 11, 1937

2,079,893

UNITED STATES PATENT OFFICE 2,079,893

METHOD OF MAKING LAMPS AND TUBES

George W. Bain and William Stanley Brian, Owensboro, Ky., assignors, by mesne assignments, to Ken-Rad Tube & Lamp Corporation, Owensboro, Ky., a corporation of Delaware Application April 1, 1935, Serial No. 14,014

7 Claims. (Cl. 250—27.5)

The present invention relates to a method of making lamps and tubes, and more particularly, although not exclusively, radio tubes.

Present day practice of manufacturing radio tubes is, in general, to form bulbs with enlargements to enable ready supporting of the bulbs for assembly with the mounts. The bulbs are provided with necks, thus necessitating that the bulbs be of greater length than the ultimate length of the finished tubes, which necks are elongated for accomplishing the sealing of the bulbs to the mounts. Such portions of the necks as are excessive are then cut off by any suitable means and become scrap. This practice entails considerable cost of manufacture, of material as well as labor.

Modern trend in design has brought about reduction in size of radio sets as well as the manufacture of so-called "midget" sets and sets for automobiles. In the construction of such midget or automobile sets, it has become necessary to reduce the size of the tubes without loss of their operating characteristics.

The present invention concerns itself with the manufacture of radio tubes and the like, utilizing shorter mounts, as by the present invention, the usual stem tubes and flares are eliminated, and wherein the bulbs are sealed to the mounts without stretching or pulling the seals. By this manner of manufacture, highly efficient radio tubes are produced which are small in size, in both directions, and which at the same time possess the same characteristics as tubes of standard construction equipped with longer mounts.

An object of the present invention is to provide a novel method of manufacturing radio tubes wherein there is an appreciable amount of saving of glass employed in the manufacture of the tubes.

Another object of the present invention is to provide a method of manufacturing radio tubes wherein the length of the bulb portion of a tube is but slightly greater than the length of the sealed-in mount.

A further object of the present invention is to provide a novel method of manufacturing radio tubes wherein the mount is sealed in a bulb by heat and pressure applied to the bulb to seal it against the press portion of the mount, without the use of a flare, thus reducing the over-all length of the bulb.

A still further object of the present invention is to provide a novel method of manufacturing radio tubes wherein the bulbs are cut to the ultimate length desired, assembled with mounts, and sealed by heating and pressing the open ends of the bulbs into intimate contact with the press portions of the mounts.

A yet further object of the present invention is to provide a novel method of manufacturing baseless radio tubes having lead wires extending from opposite ends of the tubes, by which wires the tubes may be supported in electrical association in radio circuits, without the use of bases on the tubes.

A yet further object of the present invention is to provide a novel process of manufacturing double ended radio tubes having leads extending through both ends of the tube.

Another and yet further object of the present invention is to provide a novel method of manufacturing radio tubes whereby initial cost is reduced and whereby the finished tubes are of generally cylindrical shape and shortened in length.

A still further object of this invention has to do with a novel method of installing top leads in tubes.

Another object is to provide a novel method of removing the top tubulation, after sealing off, to assure enough top lead for connection to a top cap.

The above, other and further objects of the present invention will be apparent from the following description, accompanying drawings and appended claims.

The accompanying drawings illustrate various instrumentalities whereby the method of the present invention may be practiced, and the views thereof are as follows:

Figure 1 is a top plan view of apparatus adapted to carry out the method of the present invention, and illustrates a table adapted for intermittent rotative movement in one direction for moving the tubes through the machine for carrying out successive steps of manufacture.

Figure 2 is a plan view of the rotative table of Figure 1 and showing, in dotted lines, means for imparting intermittent rotative movement to the table and also means for rotating the various tube supporting spindles in some positions of the table.

Figure 3 is a view, partially in elevation and partially in vertical section, taken substantially in the plane of line III—III of Figure 1, showing the arrangement of various parts of the mechanism at the moment a bulb is sealed about a mount to fashion a tube.

Figure 7 is an enlarged fragmental vertical sectional view through a portion of a cylindrical bulb showing its relation to a mount assembled therein, prior to sealing, and showing a mount supported on the upper end of a post forming part of a spindle structure.

Figure 8 is a view similar to Figure 7, showing the shaping jaws in closed position with the lower end of the bulb shaped and sealed to the press of the mount.

Figure 9 is an elevational view of a tube such as might be manufactured by methods in use at the present time, showing, between line A—A', the excess bulb glass required for present day methods of manufacture. The method of the present invention eliminates the stem tube and flare and also the bulb glass below the line A—A.

Figure 10 is an elevational view of one form of double-ended tubes manufactured by the process of the present invention.

Figure 11 is an elevational view of a bulb such as is utilized to produce the tube of Figure 10.

Figure 12 is a fragmental elevational view of apparatus for fashioning the double-ended tubes of Figures 10 and 14.

Figure 13 is a view similar to that of Figure 12 but taken at 90°, showing the squeezing or forming jaws or dies for rounding the ends of the tube body.

Figure 14 is an elevational view of a tube such as that illustrated in Figure 10, and taken at 90° thereto, of a double ended tube of the present invention.

Figure 4:
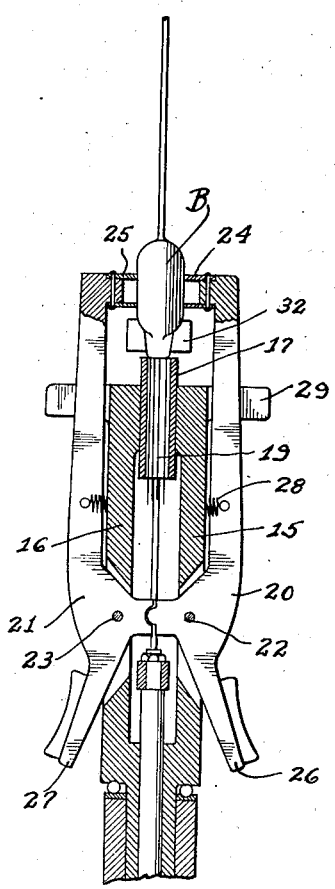
Figure 4 is a view, partially in vertical elevation and partially in vertical section, of a spindle mounted clamp showing a finished tube clamped therein and showing certain details of construction.

The drawings will now be explained.

There is illustrated in Figures 1 and 2 a machine capable of carrying out the process of the present invention and is there illustrated as consisting of a stationary table 1, suitably supported from a floor at a convenient height, by any well-known means. Centrally of the table 1 is an upstanding boss 2 through which extends a shaft 3 carrying a rotatable table 4. Upstanding from the center of the rotatable table 4 is a pillar 5 which is so supported as not to rotate with the rotatable table 4.

Secured to the underside of the table 4 is a follower disc 6 of a Geneva movement, the driver disc 7 being supported on a shaft 8 mounted in the table 1.

The rotatable table 4 is, about its periphery provided with a plurality of upstanding equally angularly spaced bosses 9 constituting the various stations of operation of the machine. Every boss 9 supports a vertically extending hollow sleeve 10, the upper end of which has an integral head 11 and the lower end of which carries a wheel 12, the surface of which is milled or corrugated, or may be provided with a plurality of teeth. A bearing member 13 is interposed between the upper end of a boss 9 and a head 11. In the accompanying drawings, there are eight such bosses or stations shown. The heads 11 are swivel heads for sealing the bulbs and mounts and carrying the tubes through various steps of manufacture.

Figure 5:
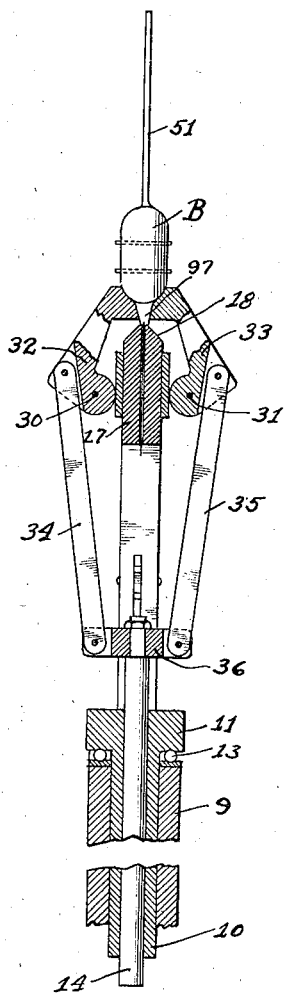
Figure 5 is a view similar to Figure 4, taken at 90° with respect to Figure 4 and showing the squeezing or forming jaws for pressing the open end of a bulb into sealing relation with a mount and for shaping the adjacent end of the bulb.

Referring to Figures 4 and 5, it will be noted that every head 11 has a vertically disposed rod 14 in the hollow sleeve 10 which extends beyond the ends of the sleeve, and which rod is axially movable. Every head 11 has, as an integral part thereof, upstanding arms 15 and 16 adapted to carry at their upper ends a plug 17 having a tapered extremity 18 which is provided throughout its length with a wide shallow opening 19 for receiving the leads from a mount supported on it for sealing relation with a bulb.

Pivoted respectively at 22 and 23 to the uprights 15 and 16 are arms 20 and 21 which at their upper ends carry clamping jaws 24 and 25 for clamping between them a bulb or tube designated as B in Figures 7 and 8. The lower extremities of the arms 20 and 21 are provided with handles 26 and 27 so that an operator may grasp these handles and separate the jaws to release or to receive a bulb or tube B. The arms 20 and 21 are retained closed, that is, with their jaws against a bulb or tube, by any suitable means, such, for instance, as the spring 28 secured at its ends to the arms.

The upper ends of the uprights 15 and 16 are connected by a bridge 29 which, at points 90° to the arms 20 and 21, have pivoted thereto, as at 30 and 31, jaw or forming members 32 and 33. The jaw members 32 and 33 are connected by links 34 and 35 to a sliding head 36 fastened to the upper end of the rod 14 so as to open and close the jaws against the lower end of an inserted bulb. The active faces of the jaws 32 and 33 are shaped to provide, in one direction, the shape of the lower end of a tube, such as that shown in Figure 5, and at 90° thereto, the shape shown in Figure 4. In other words, the lower ends of the bulbs are shaped to conform in general, to the press portion of the mount, and the heated lower extremities of the bulbs are forced into intimate, homogeneous relation with the press portions of the mounts. Figures 4 and 5 illustrate the shape of the lower end of a sealed tube and mount as accomplished by the jaws 32 and 33. The jaws 32 and 33 are moved against or away from a tube or bulb B by raising or lowering the rod 14.

Referring to Figure 1, the various stations assumed by the several bosses 9, as the table is given intermittent rotative movement in counter-clockwise direction, are indicated by reference characters G, H, K, L, M, O, P and Q. The position G is the loading position, that is, the position in which a bulb and mount are assembled in one of the spindles. At station H, heat is applied to the bulb as a preliminary heating operation preparatory to shaping; at station K, additional heat is applied, and at station L, the sealing of the bulb and mount is accomplished under maximum heat. Stations M, O and P, in the order named, are annealing stations and provided with heat of diminishing order to cool the sealed tubes. Station Q is the unloading station at which point the sealed tube is removed from the machine.

The spindles of the machine are all adapted to be rotated in all of the stations except G and Q. In order to rotate the spindles in the positions H, K, L, M, O and P, the stationary or fixed table 1 carries a plurality of vertically extending shafts R suitably supported and carrying at their upper ends friction wheels S adapted to be successively engaged by the wheels 12 of the various spindles 9 as the rotatable table 4 is intermittently rotated. That is to say, there is no rotative movement imparted to any of the spindles between the several stations or positions H, K, L, M, O and P, but that at these stations there is rotative movement of the spindles occupying such positions or stations. The lower ends of the several shafts R are provided with sprocket wheels T about which is trained a sprocket chain W.

The shaft 8 carries a sprocket 37 in mesh with the sprocket chain W for driving the chain whenever the shaft 8 is rotated. For rotating the shaft 8 and the mechanism operated by the sprocket chain W, the shaft is provided with a worm wheel 38 which meshes with a worm 39 on a shaft 40 supported from the under side of the table 1. Any suitable source of power, such as an electric motor, may be utilized to rotate the worm shaft 40 to operate the machine.

Figure 6:
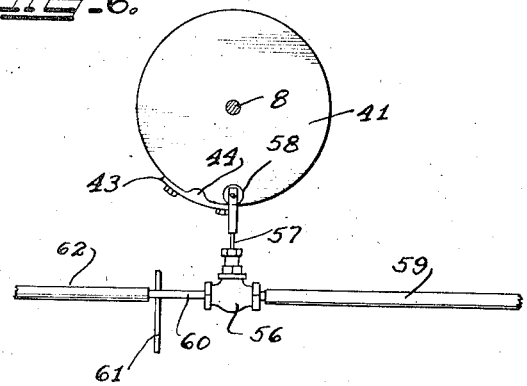
Figure 6 is a horizontal sectional view taken substantially in the plane indicated by line VI—VI of Figure 3, showing a cam for operating, in timed relation to the rotative movement of the table, the air line to a bulb for supplying air pressure to the bulb at the instant of shaping and sealing.
Figure 15:
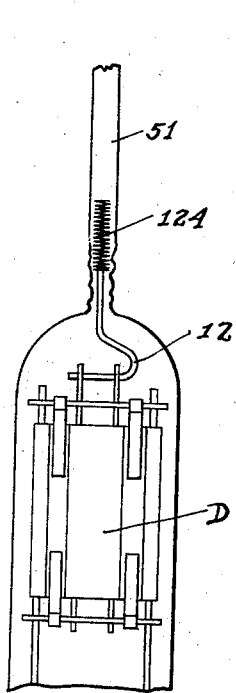
Figure 15 is an elevational view of a composite top lead, in place, and with the top lead assembly sealed into the top tubulation.
Figure 16:
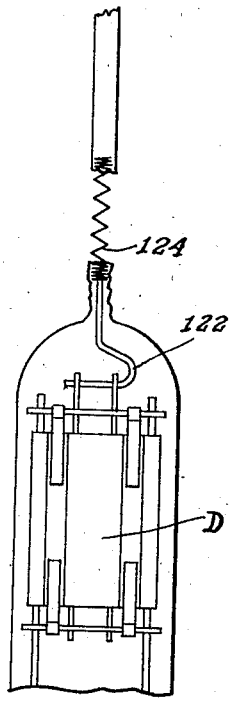
Figure 16 is a similar view, showing the tubulation broken off above the seal and the coiled wire of the composite lead stretched.
Figure 17:
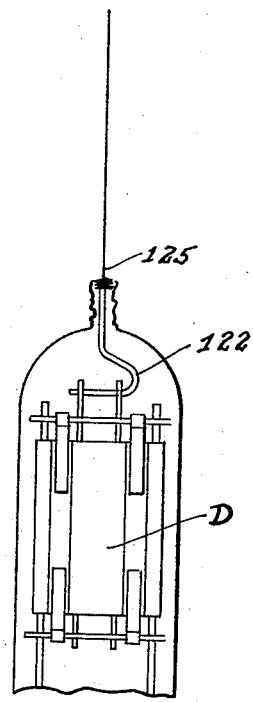
Figure 17 shows the coil straightened out to form an external connection for the top lead.
Figure 18:
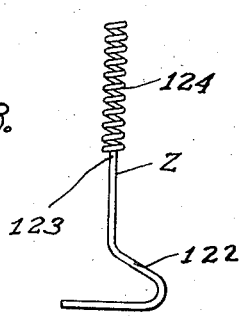
Figure 18 is an elevational view of the composite top lead of the present invention.

Carried by the shaft 8 and below the sprocket 37 is a cam disc 41 having a cam portion 42 extending below its lower surface and also having secured to its peripheral margin a plate 43 having as a part thereof an inwardly directed cam 44 (Fig. 6). Extending downwardly from the under side of the plate or table 1 is a bracket 45 which has pivoted to it at 46 a rocker arm 47, one end of which, 48, underlies the lower surface of the cam disc 41 and is adapted to be rocked by engagement of the cam member 42 as the disc is rotated. The other end of the bar 47 is pivoted at 49 to an upright rod 50 guided in and extending upwardly through the table 1 in alignment with the rod 14 of any spindle in the L position or station.

As before stated, the position or station L is the sealing or closing position where the lower end of the bulb is sealed to the mount. The upward movement of the rod 14 of the spindle in the L position closes the forming or shaping jaws 32 and 33 about the heated lower end of the bulb to shape and seal it against the mount. At the same time that the lower end of the bulb is closed by the jaws, a slight amount of air under pressure is directed into the interior of the bulb through the exhaust pipe 51 which is attached to the bulb B after its manufacture. The amount of air under pressure supplied is slight, as it has been found that but a slight amount of air is necessary to shape the lower end of the bulb about the mount, in cooperation with the forming or shaping jaws 32 and 33.

In order to automatically apply air under pressure to the tubulation or exhaust pipe 51 in the L position of the rotatable table 4, an air nozzle 52 is suspended above the axis of the L position and carries a hook 53 which automatically engages the extremity of an exhaust pipe 51 as a spindle and its supported tube is moved into L position, so that air emitted from the nozzle 52 finds entry into the bulb for aiding in shaping it. The nozzle 52 is secured to the end of an air supply line 54 in which is interposed a hand controlled valve 55. An air valve 56 having its stem 57 provided with a cam roller 58 is disposed adjacent the cam disc 41 and is connected at one end by means of a hose 59 to the hand valve 55 in the air supply line 54. The other end of the valve 56 is supported by a pipe 60 suitably secured in some part 61 of the frame structure so as to rigidify the valve 56, and to the pipe 60 is connected a hose 62 leading thereto from the air supply main 64. The cam roller 58 on the valve stem 57 is adapted to be moved upwardly, as viewed in Figure 6, by the cam 44 on the cam disc 41 once every cycle of rotation. A spring, not shown, or other equivalent means may be attached to the stem 57 of the valve 56 to return the stem to the position shown in Figure 6, after the roller 58 has left the cam 44.

The cam disc 41 and its cam members 42 and 44 are so designed that the rocker arm 47 is rocked to the position shown in Figure 3 to close the shaping jaws about the lower end of a bulb B in the L position and to open the air valve 56 to admit air discharged through the nozzle 52 into the bulb supported by the spindle in the L position.

It is not necessary to make an air tight connection between the nozzle 52 and the exhaust pipe 51, in the L position of the rotatable table 4, as but a small amount of air under pressure, as before explained, is used, and it has been found that the apparatus as herein shown and described is sufficient for the purpose.

The parts are so arranged that the shaping jaws 32 and 33 are quickly moved against the bulb supported in the holding jaws 24 and 25, when a spindle is in the L position and held in closed position a sufficient length of time for properly shaping and sealing the heated end of the bulb against the contained mount.

Intermittent rotative movement is given to the rotatable table 4 through the Geneva movement consisting of the driver 7 and the follower 6. The driver 7 is secured to the shaft 8 and rotatable with it whenever the worm shaft 40 is actuated. In this manner the rotatable table 4 is given step by step rotative movement in counterclockwise direction, as viewed in Figures 1 and 2, to progressively move a series of tubes in various stages of completion, through the machine.

In order to supply heat at several of the stations for heating and annealing, a combination of gas and air is utilized. A gas main 63 is shown surrounding three sides of the table 1 and outwardly of this is an air main 64. Both mains are connected to suitable sources of supply for furnishing gas and air, as desired.

At the first heating station H, gas burners 65 and 66 are provided disposed on opposite sides of the bulb and mount assembly at that position. The gas pipe 67 communicates with the main 63 and leads upwardly and then to a header across a portion of the table and downwardly to the burners 65 and 66. In order to intensify the heat of flame, air is supplied to the pipe 67 by a connection 68 from the air supply main 64. A hose 69 leads from the gas main 63 with branches terminating adjacent the burners 65 and 66, serving as pilot burners to prevent failure of the burners 65 and 66.

In like manner heat is supplied to a bulb in the K position by gas from a connection 70 from the main 63 leading to a header 71 from which burners 72 and 72ª are supplied with gas for discharging against a bulb in the K position. In like manner air is supplied to the burners.

In order to regulate the amount of gas and air supplied to the several burners, the gas pipes are provided with hand valves 73, and the air connections with valves 74.

Coming now to the L position, which is the sealing position and the zone of greatest heat application, the gas burners 75 and 76, disposed to discharge towards a bulb held in the spindle in the L position, are supplied with gas and air from the header 77 which in turn is supported by and supplied with gas from a pipe 78 from the main 63. Air is admitted to the pipe 78 by a hose connection 79 controlled by a valve 80. A hose 81, from the gas main 63, has branches terminating adjacent the burners 75 and 76 and serving as gas pilots. The gas supplied to the header 77 is regulated by means of a valve 82 interposed in the pipe 78.

The gas burners at the positions H, K and L are so arranged and regulated that the amount of heat applied to a bulb progressively moved to said stations is increased from a point of minimum heat application at the position H to a point of maximum heat application at the sealing position L.

After the bulb has been sealed to the mount, application of heat is made at reduced temperatures for annealing the completed tube and for controlling the cooling thereof, within certain limits. To accomplish this purpose, an annealing heat of less temperature than the heat supplied at the station L is applied to the tube in the M position, by means of jet pipes 83 and 84 suitably connected with the gas and air mains 63 and 64, and regulated by valves 85 and 86 in the gas lines and valves 87 and 88 in the air lines.

At station O, annealing heat is still applied against the tube, but at a lower temperature than that applied at the station M. At this station the heat is supplied by means of a gas flame issuing from a single jet pipe 89 in communication with the gas main 63 and supplied with air through a connection 90, controlled by an air valve 92 and a gas valve 91.

At station P an annealing heat is still applied but of least temperature, which is supplied through a jet pipe 93, whose gas and air mixture is regulated respectively by valves 94 and 95 in the connections between the gas and air mains 63 and 64, respectively.

The operation and manufacturing of tubes with the process of the present invention and employing the mechanism so far described will now be explained. For convenience in explanation, the bulb utilized with the apparatus just described will herein be termed a single ended bulb, that is, a bulb having one end closed and tubulated and the other end open, through which the mount is assembled and which is then sealed to the mount.

Referring to Figure 9, a single ended bulb, as shown in the portion of Figure 9 above the dotted line A, is provided with an exhaust pipe or tubulation 51. The open end of the bulb is at line A of Figure 9, and the bulb so made is substantially the ultimate length of the finished tube, as far as the bulb and mount are concerned.

Referring to Figure 1, at station G, the operator, after having assembled the bulb about the mount, puts the assembly in the machine with the lead wires extending through the opening 19 in the plug 17, whereupon the bulb is then clamped between the jaws 24 and 25 of the spindle in the G position, the clamping being accomplished by the operator grasping the handles 26 and 27 and squeezing them together to separate the jaws 24 and 25 for receiving the bulb. The bulb is supported in the jaws in substantially the relationship shown in Figure 7, that is, with the margin of the open end of the bulb B extending a slight distance below the press 96 of the mount, designated generally at C. The rotatable table 4 is then, by the mechanism heretofore described, given one step of movement, or indexed, to bring the spindle to the H position, where heat is applied against the bulb B through the burners 65 and 66, and the spindle rotated or spun by means of engagement of the particular one of the friction wheels S in peripheral contact with the wheel 12 of the spindle at the position H. By spinning the spindle supported bulb, the lower or open end of the bulb is uniformly heated. After a proper time interval the table is indexed another step, thus bringing the spindle to the K position. Here more heat is applied and the swivel again spun.

At the next index, the swivel is carried to the L position, where maximum heat is applied to the bulb, and the shaping jaws are then forced against the lower heated open end of the bulb B and at the same time air is supplied to the exhaust pipe 51, the jaws and air shaping the lower end of the tube, as illustrated in Figure 8 and in Figures 4 and 5. The application of the shaping jaws or dies 32 and 33 against the hot, open end of the bulb properly shapes this end for reception of a base, and at the same time seals the mount C in the tube. Such manner of sealing assures proper centralization of the mount. It will be observed that by this process the lower end of the tube is sealed to the press 96 of the mount, thus positioning the mount closely adjacent the lower end of the tube. When the mount is inserted in the bulb B at the time of assembly, the bulb is lowered over the mount so that its curved upper end is positioned adjacent the upper portion of the mount so that in the finished tube, there is but little space between the end of the mount and the corresponding end of the tube.

The shaping jaws or dies 32 and 33 are so fashioned as to mold the excess glass of the tube against the press 96 of the mount and produce somewhat the appearance indicated at 200 in Figure 8 and also in Figure 5. This portion 200 of the finished tube is elongated lengthwise, as may be observed in Figure 4. After the bulb and mount have been sealed as just described in the position L, the table 4 is indexed one step and the sealed tube subjected to the annealing heat at station M. The table 4 is subsequently indexed to bring the tube to the unloading position Q, hereupon it is removed by the operator opening the jaws 24 and 25, and manually removing the assembled tube from the spindle. The process just described is, of course, carried out continuously. As one spindle is unloaded in the Q position, it is again loaded in the G position for repetitive steps.

The Geneva movement, including the discs or members 6 and 7 is preferably so designed as to index the table for 300 indexes per hour, thus producing 300 sealed tubes per hour, although it may be varied to change the number of indexes per hour, if desired. The swivel heads or spindles are designed to be revolved 8 times per indexing position. It will be observed that the apparatus utilized for carrying out the process just described is so constructed as to enable the manufacture of cylindrical tubes, the jaws 24 and 25 being designed to receive and retain cylindrical bulbs, by gripping them somewhere between their ends.

The process of the present invention lends itself very readily to the manufacture of double ended tubes of the character illustrated in Figures 10 and 14 and shown in the apparatus of Figures 12 and 13.

In manufacturing the double ended tubes in accordance with the process of the present invention, the mount D is equipped with heavy lead wires 97 at one end and 98 at the other end. These wires are heavier and stiffer than the lead wires usually employed in connection with the manufacture of radio tubes, as the purpose thereof is to enable the installation of double ended tubes in radio circuits without having to apply bases to such tubes, the stiffness of the leads 97 and 98 being such as to support the tubes in electrically connected association with the proper circuits.

The apparatus illustrated fragmentarily in Figures 12 and 13 has been found well adapted for manufacturing double ended tubes in accordance with the process of the present invention. The head E is a combination one carrying the clamping and shaping jaws for the bulb and also carrying the gas jets for heating the bulb.

A gas pipe 99 is suitably supported, and on this is a plate 100. A lower set of shaping jaws 101 is pivoted to the lower portion of the plate 100 while an upper set of shaping jaws 102 is pivoted to the upper end of the plate. Simultaneous inward and outward movement of the members of the jaw sets is accomplished by means of linkage. Each jaw of the set 101 is pivoted at 103 to the plate 100, and to the pivots thereof are fastened arms 104. To the ends of the arms 104 are pivoted links 105 which at their lower ends are connected by the pivot 106 to a push-rod assembly, a part of which is shown at 107, for raising and lowering the pivots 106 to open and close the jaws. The members of the jaw set 102 are pivoted at 108 to the upper end of the plate 100, which pivots are fastened to arms 109 which in turn are pivoted at 110 to links 111. The other ends of the links 111 are pivoted to cross links 112, which links in turn are pivoted to links 113 pivoted to the jaw members of the set 101 so that simultaneous movement of the upper and lower jaw sets is effected whenever the push-rod assembly 107 is actuated.

In making a double ended tube in accordance with the principles of the present invention, a bulb, such as shown in Figure 11, is assembled over a mount with the mount constructed as heretofore described, that is, the mount D having heavy lead wires 97 and 98. At the time of formation of the mount D, an exhaust pipe is inserted in one of the presses of the mount.

The head E carries a lower branch gas pipe 114 which communicates with the pipe 99 and at its extremities is provided with jets 115 for directing gas towards the lower end of the inserted cylindrical bulb F in the head. An upper gas supply pipe 116 furnishes gas through branches 117 to upper jets 118 for directing heat against the upper end of the cylindrical bulb F. The parts are so arranged that the jaw sets 101 and 102 remain open until the ends of the cylindrical bulb F are sufficiently heated, whereupon by manipulation of the push-rod assembly 107, the jaws are brought together to shape and round the ends of the bulb and also to seal them to the mount.

Figure 13 is similar to Figure 12 and shows the jaws of the two sets in closed or sealing relationship and having shaped the ends of the cylindrical bulb F to make a double ended tube. The extremities of the tubes, as so shaped, have end extensions 119 and 120 which are sealed against the presses of the mount. The extensions 119 and 120 are substantially oblong in elevation when viewing the tube from 90° from that shown in Figure 13 and have the appearance of the finished tube of Figure 14. In the event that complete sealing is not accomplished, the tube fashioned as it appears in Figure 13 might be submitted to further heating and additional squeezing actions of the shaping dies.

At the present time, radio tubes and other similar tubes or bulbs are manufactured by supplying the mounts with elongated flares and drawing the necks of the bulbs about the flares for sealing purposes. After sealing, the collets must be cut off and become scrap or waste material.

Figure 9 illustrates, between lines A and A', the amount of waste material there would be if a cylindrical tube were manufactured in accordance with present day methods. The present invention obviates the use of additional material for the stem tubes and flares, and also obviates the necessity of elongating the necks of bulbs to seal the bulbs and mounts together in proper relationship. The amount of waste necessarily essential with present day methods of manufacture is therefore eliminated, thus making possible the manufacture of radio and other tubes at lowered costs as to material and labor.

The open ended cylindrical bulb F is supported in the head by means of clamps 121, suitably mounted and operated.

Many modern radio tubes provide for circuit connections at the tops of the tubes. Such connections employ top leads from the mounts. It is usual to make but a single connection at the top of a tube. In the manufacture of such tubes an exhaust tube is secured to the mount press adjacent the base of a tube and a tubulation is applied to the top end of a bulb, prior to its assembly with its mount, for the top lead or connection.

The present invention eliminates the exhaust tube connected to the mount press and utilizes the top tubulation for the double purpose of exhausting a tube and receiving the top lead. At the conclusion of the exhausting step, the tubulation is sealed off close to the tube so as to form a gas-tight seal about the top lead. The excess portion of the tubulation is then removed and a top cap applied over the seal.

In the manufacture of radio tubes in practice at the present time, utilizing top leads, an exhaust tube is secured to the stem tube and a top tubulation is fastened to the bulb for the top lead. The top tubulation is then cut off to the proper length and sealed to the top lead before the tube is exhausted.

It has been found that when the top tubulation has been used for exhausting the tube and then sealed after exhausting, it has been difficult to limit the extent of sealing of the glass against the wire so as to permit cutting off the tube above the sealed region and short enough to receive a standard top cap.

It has been found difficult to remove the tubulation without having to crumple the glass in the sealed region as it is difficult to free the end of the dumet lead from the excessive part of the tubulation. To overcome this, there is used a composite lead consisting of the usual dumet having welded to its outer end a coil of wire, such as nickel or other metal, possessing such characteristics as not to readily seal to the glass. After the tube has been exhausted through the top tubulation, the tube is then sealed off about the outer end of the dumet, making a tight seal about the dumet and a loose seal about the coil. The tubulation is then broken off in the region of the coil. Because of the fact that the coil is not firmly sealed to the glass, it is possible to pull off the broken off portion of the tubulation, whereupon the coil may be pulled out and straightened, thus providing a wire connection which may be readily attached to the usual top cap of standard size.

The term "dumet" has herein been used generically, and by way of example, and it is not used as a limitation. It is intended to include all compositions of metal adapted for sealing to glass in the manufacture of radio and like tubes.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. That improvement in the methods of applying top leads to radio tubes which consists in coiling a wire of such characteristics that it does not readily seal to glass, securing such coil to a dumet, inserting the lead in a top tubulation of a tube, sealing off the tubulation about the dumet, breaking off the tubulation at a point in the region of the coil, and unwinding the coil to provide a wire tip for connection to a top cap.

2. That improvement in the methods of inserting top leads in radio tubes which includes applying a top tubulation to a bulb, coiling a wire of nickel, connecting the coil to an end of the dumet, inserting the coil and part of the dumet in the top tubulation, sealing off the tubulation about the dumet, breaking off the tubulation in the region of the coil, and unwinding the coil to provide a wire tip for connection to a top cap.

3. A composite top lead for radio tubes including a dumet section and a section of coiled wire, said coiled wire having such characteristics that it will not readily seal with glass, said coil adapted to be uncoiled after said lead has been sealed off to provide a wire tip for connection to a top cap.

4. That improvement in the methods of applying top leads to radio tubes which consists in coiling a wire of such characteristics that it does not readily seal to glass, securing such coil to a dumet, inserting the lead in a top tubulation of a tube, sealing off the tubulation about the top lead making a tight seal about the dumet and a loose seal about the coil, breaking off the tubulation at a point in the region of the coil, and unwinding the coil to provide a wire tip for connection to a top cap.

5. The method of manufacturing double ended tubes which comprises the steps of assembling a mount including a press at each end, attaching an exhaust pipe to one of the presses, inserting the mount in a glass bulb, supporting the bulb by means positioned between its ends, and heating and simultaneously die pressing the ends of the bulb into sealing contact with said presses to seal the bulb.

6. The method of making radio tubes which comprises the steps of inserting a mount and its press into an open ended bulb with the open end of the bulb adjacent the press, heating the open end of the bulb, and die pressing the bulb end into contact with the press to seal the bulb and center the mount in the bulb.

7. The method of making radio tubes which comprises the steps of inserting a mount and its press in an open ended bulb with the open end of the bulb adjacent the press, heating the open end of the bulb, spinning the mount and the bulb while being heated, and die pressing the bulb end into sealing relation with the press while spinning the same in the presence of heat.

GEORGE W. BAIN.
WILLIAM STANLEY BRIAN.